United States Patent
Kemmerich

[11] Patent Number: 5,177,836
[45] Date of Patent: Jan. 12, 1993

[54] HOSE CLAMP

[75] Inventor: Josef Kemmerich, Attendorn-Kraghammer, Fed. Rep. of Germany

[73] Assignee: Kemmerich & Co. KG, Attendorn, Fed. Rep. of Germany

[21] Appl. No.: 887,247

[22] Filed: May 19, 1992

Related U.S. Application Data

[63] Continuation of Ser. No. 782,167, Oct. 24, 1991, abandoned.

[30] Foreign Application Priority Data

Oct. 31, 1990 [DE] Fed. Rep. of Germany ....... 4034626

[51] Int. Cl.⁵ ...................... B65D 63/02; F16L 33/02
[52] U.S. Cl. ............................... 24/20 R; 24/20 CW; 24/20 TT
[58] Field of Search ............. 24/20 R, 20 W, 20 CW, 24/20 TT, 20 EE, 23 EE, 30.5 P, 16 R, 279

[56] References Cited

U.S. PATENT DOCUMENTS

| | | | |
|---|---|---|---|
| 1,272,541 | 7/1918 | Scott | 24/279 |
| 2,852,832 | 9/1958 | Jones | 24/279 |
| 4,299,012 | 11/1981 | Oetiker | 24/20 CW |
| 4,492,044 | 1/1985 | Oetiker | 24/20 R |
| 4,622,720 | 11/1986 | Oetiker | 24/20 CW |
| 4,712,278 | 12/1987 | Oetiker | 24/20 W |
| 4,987,651 | 1/1991 | Oetiker | 24/20 R |
| 4,991,266 | 2/1991 | Oetiker | 24/20 R |
| 5,033,167 | 7/1991 | Uchman | |

FOREIGN PATENT DOCUMENTS

| | | |
|---|---|---|
| 3017666 | 5/1980 | Fed. Rep. of Germany . |
| 3017667 | 5/1980 | Fed. Rep. of Germany . |
| 2161207 | 1/1986 | United Kingdom . |
| 2175042 | 11/1986 | United Kingdom . |

Primary Examiner—Victor N. Sakran
Attorney, Agent, or Firm—Herbert Dubno

[57] ABSTRACT

A hose clamp in which the band encircling the hose is formed on the outer segment with a step inwardly of the clamping element and with openings into which hooks of the inner segment engage. A free end of the inner segment terminates at a distance from the step which extends only over half the width of the band and any gap between the free end and the step and axially bridged by an extension of the free end of the inner segment which has a radially directed lug engaged in a longitudinal slit of the outer segment.

6 Claims, 2 Drawing Sheets

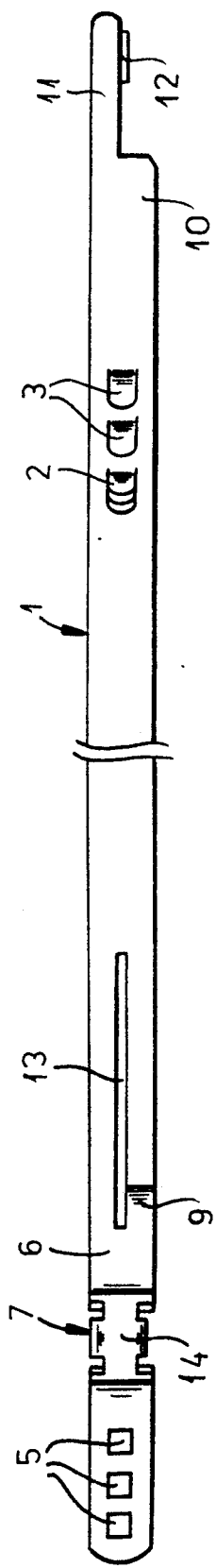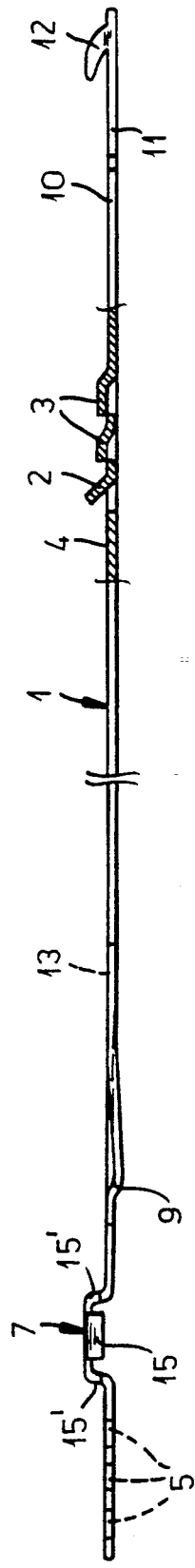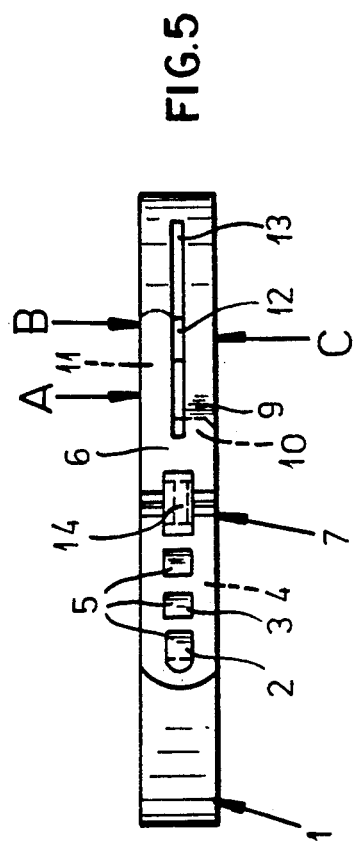

HOSE CLAMP

This is a continuation of co-pending application Ser. No. 07/782,167 filed on Oct. 24, 1991 now abandoned.

FIELD OF THE INVENTION

My present invention relates to a hose clamp formed from an open-ended clamping band which, upon being wound around a hose to be clamped, has overlapping inner and outer band segments which can be hooked together so that the band can be tensioned against the hose by drawing the parts of a clamping element formed in the band together.

BACKGROUND OF THE INVENTION

Hose clamps of the aforedescribed type in which the inner end segment has retaining and bracing hooks which, in indexing of the band to the circumference of the hose, are received in corresponding openings in the outer band segment, are used to press a hose tightly against a support fitting over which the hose can be engaged. The inner end of the outer band segment can be formed with an outwardly projecting step having a height corresponding to that of the thickness of the band (see German Patent Documents DE 30 17 667 C2 and DE 30 17 666 C2). These hose clamps provide an inner surface of the band or the ring formed by the engagement of the inner segment in the outer segment which is substantially gap-free so that leakage of less yieldable plastic hoses or tubing to which the clamp can be applied, is avoided or minimized. Such hoses are commonly used in the automotive industry as, for example, axle sleeves and gasoline lines.

OBJECTS OF THE INVENTION

It is an object of the invention to provide a hose clamp of the aforedescribed type which can ensure reliable mounting and sealing of a hose, especially plastic hoses and tubing which may be less yieldable.

Another object of the invention is to provide an improved hose clamp of a different construction than prior art hose clamps which can be fabricated inexpensively and can be reliably tensioned against a hose to provide, along the inner surface of the hose clamp, an especially gap-free pressure upon the hose.

SUMMARY OF THE INVENTION

These objects and others which will become more readily apparent hereinafter are attained, in accordance with the present invention, in a hose clamp which comprises:

a clamping band formed into a ring for encircling a hose and having an inner band end segment overlapped by an outer band end segment;

outwardly turned retention and support hooks formed on the inner band end segment and indexingly engaging through openings formed in the outer band end segment;

a clamping element formed on the outer band end segment for tightening the ring around the hose, whereby tension is exerted on the band by drawing the clamping element together;

a step formed in an inner end portion of the outer segment of a height substantially equal to a thickness of the band and extending in width from one longitudinal edge of the band only over substantially half a width of the band;

a free end formed on the inner segment and terminating at a distance from the step corresponding substantially to a length by which the clamping element is drawn together; and an extension of the band projecting beyond the free end over substantially half the width of the band adjacent and alongside the step, substantially flush with an opposite longitudinal side of the band, and of a length greater than a distance between the free end and the step, the clamping element being spanned by the inner segment along an inner side of the clamping element.

In this hose clamp, the step along the inner surface of the outer band segment extends only over half the width of this segment and flanks the aforementioned extension which projects beyond the end of the inner band segment terminating at a distance from the step and which, in turn, also extends over about half the width of the outer band segment so that its outer edge is flush with the outer edge of the outer band segment. Since this extension lies laterally against the step and along the unstepped half of the outer band segment and has a length which is greater than the distance of the free end of the inner segment from the step, the inner band segment is extended by the extension beyond the step and can bridge across the clamping element even before it is drawn together to apply tension to the band, thereby precluding any gap along the inner surface of the ring.

In the clamped state, there may remain between the step and the free extremity of the inner segment a gap, but alongside this gap, the extension projects beyond the step, thereby eliminating any possibility of leakage in this region adjacent the step. In this case, therefore, the extension serves as a lateral bridge across the region provided with the step.

While the free end of the extension can form a step, it is provided adjacent a region of the outer clamp segment which is free from a step and thus, upon tensioning of the clamp, ensures a reliable seal and a gap-free compression of the hose.

The clamping element or device can be a clamping eye fully covered internally by the inner segment so that in all states of the clamp, a continuous internal contour is provided across the clamping eye for reliable sealing.

According to the invention, the extension in the untensioned state of the clamp is longer than the distance between the unextended free end of the inner segment and the step in the outer segment by a distance at least equal to the width of the extension and preferably at least equal to 1.5 times the width of the extension.

In an especially preferred configuration, the extension has a radially outwardly projecting guide part which may be a lug bent at a right angle from this extension and extending through a longitudinally extending slit of the outer segment. The length of the slit is at least equal to the length by which the clamping element is drawn together and is preferably greater than twice as long.

The step in the outer band segment should extend substantially half the width of the band and, therefore, up to the longitudinal slit which may be located midway along the band. The width of the extension can correspond to the distance between the longitudinal slit and the other longitudinal edge of the band and the lug and slit may then be disposed substantially midway along the width of the band.

The longitudinal slit and the lug provide a lateral guidance of the inner extremity of the band so that upon tensioning of the clamp, there will not be any tendency for the inner band segment to slip axially out of full registry with the outer band segment.

Preferably, the lug is hook-shaped and the opening of the hook is turned toward an end edge of the slit, proximal to the free end of the outer segment. In this case, the hook can serve as a catch for engagement with this edge when the band is initially positioned on the hose and before the clamp element is tightened.

The clamping element can be a clamping eye whose base is spaced from the outer surface of the outer segment and which is connected thereto at opposite longitudinal ends of this base by appropriate bends. The eye can be laterally opened on both sides and the base at the open sides may be formed with stiffening bends turned inwardly and serving to eliminate sharp lateral edges while preventing undesirable deformation of the base upon tensioning of the clamp.

To ensure precise guidance of the inner segment upon tightening of the clamp, instead of or in addition to the lug engageable in the longitudinal slit, guide lugs or formation can be provided on the outer lateral edges of the outer segment to flank the longitudinal edges of the inner segment to bridge the clamping eye, an element can be introduced which at its longitudinal edges is formed with diametrically opposite extensions which can engage steps formed on opposite sides of the clamping eye, each over a portion of the width of the outer edge and on opposite halves thereof. The desired bridging of the clamping eye is thus ensured. In this latter embodiment, the separations of the clamping band can lie diametrically opposite the clamping eye so that one half-step formation is provided on one part of the clamping band and a laterally offset arrangement is provided on a projection of the other clamping band part.

These constructions are analogous to those described, for example, in DE 30 17 667 C2.

BRIEF DESCRIPTION OF THE DRAWING

The above objects, features and advantages of my invention will become more readily apparent from the following description, reference being made to the accompanying drawing in which:

FIG. 1 is a open plan view of the band of a hose clamp of the invention;

FIG. 2 is a developed viewing cross-section of the band;

FIG. 5 is a detail view in plan view of the clamping element.

SPECIFIC DESCRIPTION

Figure 4:
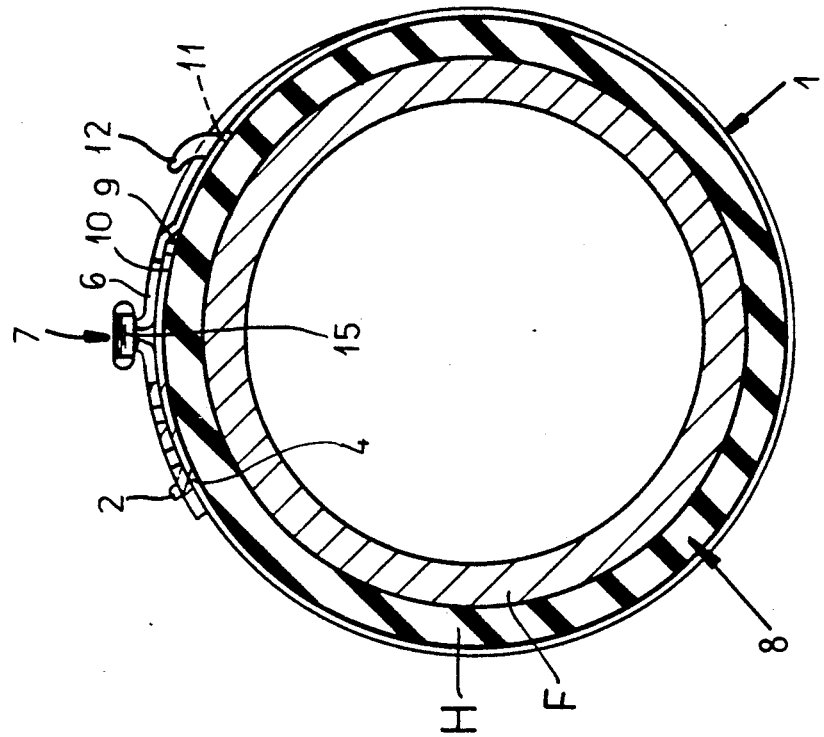
FIG. 4 is a view similar to FIG. 3 after tensioning of the band and showing the implement of this clamp on a hose and a fitting upon which the hose is provided.

The hose clamp comprises a clamping band 1 which is open at its ends and which can be bent around a hose H to clamp the latter against a fitting F (FIG. 4). In the bent-around position, the band assumes the configuration of a ring with outwardly directed retaining and support hooks 2,3 of an inner band segment, engaging in corresponding openings 5 of the outer band segment 6. The outer band segment is also formed with a clamping element 7 in the form of an eye which can have opposite parts thereof drawn together (compare FIGS. 3 and 4) by pliers or the like, to tension the band. The element upon which the clamp is fitted is represented generically at 8 and has been shown somewhat diagrammatically.

According to the invention, at the inner end of the outer segment, the band is formed with a step 9 having a height equal to that of the band thickness as is especially apparent from FIGS. 1 and 5 and which extends only over half the width of the outer band segment 6. The inner band segment has a free end 10 which terminates at a distance from the step 9 (FIG. 3) corresponding substantially to the distance by which the eye 7 is contracted when tension is applied.

The end 10 has, projecting therebeyond over about half the width of the outer segment, an extension 11 which lies laterally against the step 6 and radially against the unstepped outer band segment 6. The extension 11 has a length which is greater than the distance of the unextended end 10 from the step 9. Preferably the clamping element 7 is so constructed that it is inwardly covered by the inner segment 4 including the end 10. The extension 11 is, in the case of the untensioned clamp as shown in FIG. 3, longer than the spacing between end 10 and step 9 by a distance which is at least equal to and preferably is greater than the width of the extension 11 and, most advantageously, is greater than 1.5 times the width of the extension 11.

To assist in guiding the extension 11, the latter is formed with a radially outwardly extending guidance part 12 received in a longitudinal slit of the outer segment 6 underlain by the extension 11. The length of the slit 13 is at least equal to the tensioning contraction of the eye 7, but preferably greater than twice as long. It has been found to be especially advantageous for the slit 13 to begin proximal to the clamping element 7 and to run a significant portion of the length of the outer segment 6.

The guide part 12 is a lug bent at a right angle to the extension 11 substantially midway of the width of the outer segment and engaging in the slit 13 which likewise lies substantially midway of the band. The lug 12 is hook-shaped and has the mouth of the hook turned toward an end edge of the slit 13 which is proximal to the free end of the outer segment 6, i.e. to the left in FIGS. 1 through 5.

Figure 3:
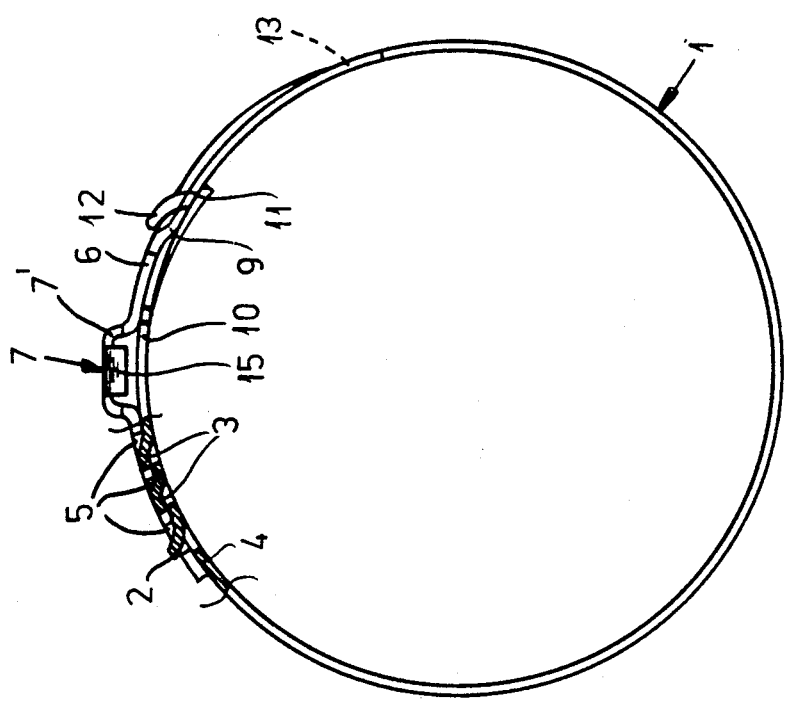
FIG. 3 is an elevational view of the band formed into a ring, partly broken away and shown prior to tensioning of the band.

The clamping element 7 is in the form of an eye whose base 14 is spaced from the outer surface of the outer segment 6 and is connected thereto by bends 15' which are urged together when the eye is contracted (compare FIGS. 3 and 4). Between the bends 15', the base is provided with downwardly and inwardly turned bends 15 along the free lateral edges 7' of the base 14.

In the clamped position shown in FIGS. 4 and 5, a first sealing region effective in the axial direction is obtained in the region A of FIG. 5 where between the end 10 and the step 9 there may be a greater or lesser gap which, however, is bridged or sealed by the extension 11. In the region B, especially at the free end of the extension 11, there is a step which would be a possible leakage locationed except that axially aligned therewith is a planar sealing surface of the outer claim part in the region C so that the desired sealing is effective.

The invention, of course, is not limited to the embodiment described, but includes modifications within the scope of the appended claims as well and all of the features disclosed and illustrated are considered to contribute to the invention individually and in any combination.

I claim:

1. A hose clamp comprising:

a clamping band formed into a ring for encircling a hose and having an inner band end segment overlapped by an outer band end segment;

outwardly turned retention and support hooks formed on said inner band end segment and indexingly engaging through openings formed in said outer band end segment;

a clamping element formed on said outer band end segment for tightening said ring around said hose, whereby tension is exerted on said band by drawing said clamping element together;

a step formed in an inner end portion of said outer segment of a height substantially equal to a thickness of the band and extending in width from one longitudinal edge of the band only over substantially half a width of said band;

a free end formed on said inner segment and terminating at a distance from said step corresponding substantially to a length by which said clamping element is drawn together; and an extension of said band projecting beyond said free end over substantially half the width of said band adjacent and alongside said step, substantially flush with an opposite longitudinal side of said band, and of a length greater than a distance between said free end and said step, said clamping element being spanned by said inner segment along an inner side of said clamping element, said extension having a length in an untensioned state of said band which is longer than said distance by at least 1.5 times the width of said extension, said extension having a radially outwardly extending guide portion received in a longitudinal slit formed in said outer band segment and having a length at least equal to the length by which said clamping element is drawn together.

2. The clamp defined in claim 1 wherein said length of said slit is greater than twice said length by which said clamping element is drawn together.

3. The clamp defined in claim 1 wherein said guide portion is a lug bent at a right angle from said extension along a lateral edge thereof confronting said step and disposed substantially midway of the width of said outer segment, said slit being provided substantially midway of the width of said outer segment.

4. The clamp defined in claim 3 wherein said lug is generally hook-shaped and has a hook opening turned in a direction of an end edge of said slit proximal to a free extremity of said outer segment.

5. The clamp defined in claim 1 wherein said clamping element is a clamping eye having a base connected to said outer segment by bends spaced apart along said band and adapted to be drawn together to tension the band.

6. A hose clamp comprising:

a clamping band formed into a ring for encircling a hose and having an inner band end segment overlapped by an outer band end segment;

outwardly turned retention and support hooks formed on said inner band end segment and indexingly engaging through openings formed in said outer band end segment;

a clamping element formed on said outer band end segment for tightening said ring around said hose, whereby tension is exerted on said band by drawing said clamping element together;

a step formed in an inner end portion of said outer segment of a height substantially equal to a thickness of the band and extending in width from one longitudinal edge of the band only over substantially half a width of said band;

a free end formed on said inner segment and terminating at a distance from said step corresponding substantially to a length by which said clamping element is drawn together; and an extension of said band projecting beyond said free end over substantially half the width of said band adjacent and alongside said step, substantially flush with an opposite longitudinal side of said band, and of a length greater than a distance between said free end and said step, said clamping element being spanned by said inner segment along an inner side of said clamping element, said clamping element being a clamping eye having a base connected to said outer segment by bends spaced apart along said band and adapted to be drawn together to tension the band.

* * * * *